(12) United States Patent
Kenington et al.

(10) Patent No.: US 8,290,536 B2
(45) Date of Patent: Oct. 16, 2012

(54) RADIO TRANSCEIVER AND METHOD FOR RECEPTION OF COMBINED RECEIVE SIGNALS

(75) Inventors: Peter Kenington, Chepstow (GB); Martin Weckerle, Ulm (DE)

(73) Assignee: Ubidyne, Inc., Wilmington, DE (US)

( * ) Notice: Subject to any disclaimer, the term of this patent is extended or adjusted under 35 U.S.C. 154(b) by 35 days.

(21) Appl. No.: 12/898,208

(22) Filed: Oct. 5, 2010

(65) Prior Publication Data

US 2012/0083216 A1 Apr. 5, 2012

(51) Int. Cl.
*H04M 1/00* (2006.01)
(52) U.S. Cl. ........... 455/553.1; 455/552.1; 455/73
(58) Field of Classification Search ............ 455/73, 455/78, 552.1, 553.1
See application file for complete search history.

(56) References Cited

U.S. PATENT DOCUMENTS

| | | | | |
|---|---|---|---|---|
| 5,212,813 A * | 5/1993 | Renaud | ............. | 455/82 |
| 6,466,768 B1 * | 10/2002 | Agahi-Kesheh et al. | ....... | 455/78 |
| 2002/0173337 A1 * | 11/2002 | Hajimiri et al. | ............. | 455/552 |
| 2005/0037800 A1 * | 2/2005 | Shih | ............. | 455/550.1 |
| 2007/0298838 A1 * | 12/2007 | Meiyappan et al. | ....... | 455/553.1 |

* cited by examiner

*Primary Examiner* — Lewis West
(74) *Attorney, Agent, or Firm* — Stephen H. Eland; Dann, Dorfman, Herrell & Skillman

(57) ABSTRACT

A radio transceiver comprising at least two individual receive paths and at least two individual transmit paths is disclosed. The radio transceiver includes a first filter arrangement for separating individual ones of the at least two individual transmit paths from a combined one of the at least two individual receive paths, a splitter for splitting the combined one of the at least two receive paths into the individual receive paths; and a second filter arrangement for separating combined receive bands on the combined one of the at least two receive paths into individual receive bands on the individual receive paths. A method for the reception of combined receive signals in at least two receive frequency bands is also disclosed.

12 Claims, 4 Drawing Sheets

----------Triplexer frequency response

RADIO TRANSCEIVER AND METHOD FOR RECEPTION OF COMBINED RECEIVE SIGNALS

CROSS REFERENCE TO RELATED APPLICATIONS

This application is related to U.S. patent application Ser. No. 12/898,021 filed Oct. 5, 2010, entitled "Radio Transmitter and Method for Transmission of Combined Signal". The entire contents of the foregoing application are incorporated herein by reference.

FIELD OF THE INVENTION

The field of the invention relates to multi band transceivers and to a method for the reception of combined receive signals in at least two frequency bands.

BACKGROUND OF THE INVENTION

The use of mobile communications networks has increased over the last decade. Operators of the mobile communications networks have increased the number of base stations in order to meet an increased demand for service by users of the mobile communications networks. The operators of the mobile communications networks wish to reduce the running costs of the base station. One option to do this is to implement a radio system as an antenna-embedded radio forming an active antenna array. Many of the components of the antenna-embedded radio may be implemented in one or more chips.

Nowadays active antenna arrays are used in the field of mobile communications systems in order to reduce power transmitted to a handset of a customer and thereby increase the efficiency of the base station, i.e. the radio station. The radio station typically comprises a plurality of antenna elements, i.e. an antenna array adapted for transceiving a payload signal. Typically the radio station comprises a plurality of transmit paths and receive paths. Each of the transmit paths and receive paths are terminated by one of the antenna elements. The plurality of the antenna elements used in the radio station typically allows the steering of a beam transmitted by the antenna array. The steering of the beam includes but is not limited to at least one of: detection of direction of arrival (DOA), beam forming, down tilting and beam diversity. These techniques of beam steering are well-known in the art.

The code sharing and time division strategies as well as the beam steering rely on the radio station and the antenna array to transmit and receive within well defined limits set by communication standards. The communications standards typically provide a plurality of channels or frequency bands useable for an uplink communication from the handset to the radio station as well as for a downlink communication from the radio station to the handset. In order to comply with the communication standards it is of interest to reduce so called out of band emissions, i.e. transmission out of a communication frequency band or channel as defined by the communication standards.

For example, the communication standard "Global System for Mobile Communications (GSM)" for mobile communications uses different frequencies in different regions. In North America, GSM operates on the primary mobile communication bands 850 MHz and 1900 MHz. In Europe, Middle East and Asia most of the providers use 900 MHz and 1800 MHz bands.

Digital dividend spectrum auctions and other releases of frequency spectrum have led to the desire from operators for multi-band products. Multi-band products save space on masts and hence save site rental and installation costs. The multi-band products may also enable two bands to be accommodated on heavily used masts where no space exists for additional antennas.

The multi-band products are conventionally implemented by providing a plurality of remote individual transceivers and a separate diplexer. Each one of the plurality of transceivers corresponding to an individual band of the plurality of communications bands.

FIG. 1 shows a conventional dual-band transceiver 1' based on two individual band transceivers 1A, 1B. A digital signal processor (DSP) 15' receives and processes a transmit digital signal 2000. The digital signal processor (DSP) 15' also receives and processes a receive digital signal 2100.

The individual band transceiver 1A comprises a transmit path 1000-1A carrying a transmit signal 2000-1A and a receive path 1100-1A carrying a receive signal 2100-1A. The individual band transceiver 1B comprises a transmit path 1000-2B carrying a transmit signal 2000-2B and a receive path 1100-2B carrying a receive signal 2100-2B.

The transmit signal 2000-1A comprises signals of frequencies in a first transmit band frequency TB1. The transmit signal 2000-2B comprises signal of frequencies in a second transmit frequency band TB2. Similarly, the receive signal 2100-1A comprises signals of frequencies in a first receive frequency band RB1. The receive signal 2100-2B comprises signals of frequency in a second receive frequency band RB2.

Each of the transmit paths 1000-1A, 1000-2B comprises a digital-to-analogue conversion and upconversion block 2-1, 2-2, a first filter 3-1, 3-2, and a radio frequency amplifier 4-1, 4-2.

The transmit signal 2000-1A, 2000-2B is converted into an analogue form and up-converted to radio frequency by the digital-to-analogue conversion and upconversion block 2-1, 2-2. The first filter 3-1, 3-2 is adapted for passing the transmit frequency band TB1, TB2 and to remove unwanted products from the digital-to-analogue conversion process. The output of the first filter 3-1, 3-2 is passed to a radio frequency amplifier 4-1, 4-2.

The output of the amplifier 4-1 on the transmit path 1000-1A is passed to a duplexer 5-1. The duplexer 5-1 is adapted to appropriately separate the analogue transmit signal 2000-1A leaving the amplifier 5-1 and the analogue receive signals 2100-1A for their specific bands TB1, RB1.

The output of the amplifier 4-2 on the transmit path 1000-2B is passed to a duplexer 5-2. The duplexer 5-2 is adapted to appropriately separate the analogue transmit signal 2000-2B leaving the amplifier 5-2 and the analogue receive signals 2100-2B for their specific communications bands TB2, RB2.

The output of duplexer 5-1, 5-2 in the transmit path 1000-1A, 1000-2B corresponds to the radio frequency output of the transceiver 1A, 1B. The output of the duplexer 5-1, 5-2 feeds a diplex filter 6, which separates the transmit signal 2000-1A carrying the transmit frequency band TB1 and the transmit signal 2000-1A carrying the transmit frequency band TB2. This allows the two transceivers 1A and 1B to operate independently of each other.

The diplex filter 6 receives the receive signal 2100-1A, 2100-2B of the multi-band transceiver. The receive signal 2100-1A carries the receive frequency band RB1, and the receive signal 2100-2B carries the receive frequency band RB2.

The diplex filter 6 feeds the duplexers 5-1, 5-2 in the receive paths 1100-1A, 1100-2B, respectively. The receive signal 2200-1A, 2200-2B leaving the duplexer 5-1, 5-2 in the receive paths 1100-1A, 1100-2B is passed to a low noise amplifier 8-1, 8-2.

After amplification, the receive signal 2200-1A, 2200-2B is passed to a filter arrangement 9-1, 9-2 followed by an analogue-to-digital conversion and downconversion block 10-1, 10-2.

The filter arrangement 9-1 is adapted for passing the receive frequency band RB1 of the received signal 2200-1A on the individual one of the receive paths 1100-1A. The filter arrangement 9-2 is adapted for passing the receive frequency band RB2 of the received signal 2200-2B on the individual one of the receive paths 1100-1B.

This dual band transceiver as described in FIG. 1 is however both expensive and inefficient. The diplex filter needs to be of high power, which makes the diplex filter expensive. The diplexer also introduces losses that come on top of the duplexer losses already present in each of the individual band transceivers 1A, 1B. This in turn reduces the output power, the system efficiency and increases the receiver noise figure. All of these have an undesirable impact upon system performance.

Additionally, in the case of an active antenna system, the very tight space and cost requirements would increase the loss in this diplexer significantly, hence making this conventional solution very unattractive.

An alternative conventional dual-band transceiver is shown on FIG. 2. The alternative dual-band transceiver differs from the dual-band transceiver of FIG. 1 in that the two duplexers 5-1, 5-2 and the diplexer 6 are replaced by a quadruplexer 7.

The use of the quadruplexer 7 instead of the two duplexers 5-1, 5-2 and the diplexer 6 overcomes much of the additional loss introduced by the diplexer 6. However, the alternative conventional dual-band transceiver of FIG. 2 is still very large and expensive, due, primarily, to the size and cost of the quadruplexer.

SUMMARY OF THE INVENTION

The present disclosure discloses a radio transceiver comprising at least two individual receive paths and at least two individual transmit paths; a first filter arrangement for separating individual ones of the at least two individual transmit paths from a combined one of the at least two individual receive paths, a splitter for splitting the combined one of the at least two receive paths into the individual receive paths, a second filter arrangement for separating combined receive frequency bands on the combined one of the at least two receive paths into individual receive frequency bands on the individual receive paths.

In one aspect of the disclosure, the first filter arrangement comprises a band pass filter adapted to filter at least two combined receive frequency bands.

In another aspect of the disclosure, the radio transceiver comprises an amplifier for amplifying the combined receive bands on the combined one of the at least two receive paths.

In yet another aspect of he disclosure, the second filter arrangement comprises at least two individual filters, one of the at least two individual filters being on one of the at least two individual receive paths and being adapted to filter one receive frequency band from the combined receive frequency bands, and another one the at least two individual filters being on another one of the at least two individual receive paths and being adapted to filter another receive frequency band from the combined receive frequency bands.

The splitter and the second filter arrangement comprises in one aspect of the disclosure a diplex filter.

In another aspect of the invention, the radio transceiver comprises at least two individual amplifiers, one of the at least two individual amplifiers being on one of the at least two individual receive paths for amplifying an individual one of the at least two receive frequency bands, and another one the at least two individual amplifiers being on another one of the at least two individual receive paths for amplifying another individual one of the at least two receive frequency bands.

The present disclosure also teaches a method for the reception of combined receive signals in at least two receive frequency bands. The method comprises: distinguishing the combined receive signals from at least two transmit signals by filtering, to form filtered combined receive signals; amplifying the filtered combined receive signals using a single amplifier to form amplified combined receive signals; separating the amplified combined receive signals into at least two individual receive signals, one of the at least two individual to receive signals being in one of the at least two receive frequency bands, and another one of the at least two individual receive signals being in another one of the at least two receive frequency bands.

In one aspect of the disclosure, the method for the reception of combined receive signals comprises filtering at least two combined receive frequency bands with a bandpass filter adapted for filtering the at least two combined receive frequency bands.

In another aspect of the disclosure, the method for the reception of combined receive bands comprises amplifying the combined receive bands on the combined one of the at least two receive paths.

In one aspect of the disclosure, the step of separating the amplified combined receive signals into individual receive signal bands in the at least two receive frequency band comprises separating the amplified combined receive signals into individual receive signal bands on individual receive paths.

The present disclosure also teaches a computer program product comprising a non-transitory computer-usable medium having control logic stored therein for causing a computer to manufacture a radio transceiver for a mobile communications network, the radio transceiver comprising: at least two individual receive paths and at least two individual transmit paths; a first filter arrangement for separating individual ones of the at least two individual transmit paths from a combined one of the at least two individual receive paths; a splitter for splitting the combined one of the at least two receive paths into the individual receive paths; a second filter arrangement for separating combined receive frequency bands on the combined one of the at least two receive paths into individual receive frequency bands on the individual receive paths.

The present disclosure further teaches a computer program product comprising a non-transitory computer-usable medium having control logic stored therein for causing a transceiver to execute a method for a method for the reception of combined receive signals in at least two receive frequency bands. The computer program product comprises: first computer readable code means for distinguishing the combined receive signals from at least two transmit signals by filtering, to form filtered combined receive signals; second computer readable code means for amplifying the filtered combined receive signals using a single amplifier to form amplified combined receive signals; third computer readable code means for separating the amplified combined receive signals into individual receive signal bands in the at least two receive frequency bands.

DESCRIPTION OF THE FIGS.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature or features of a different aspect or aspects and/or embodiments of the invention.

Figure 3:
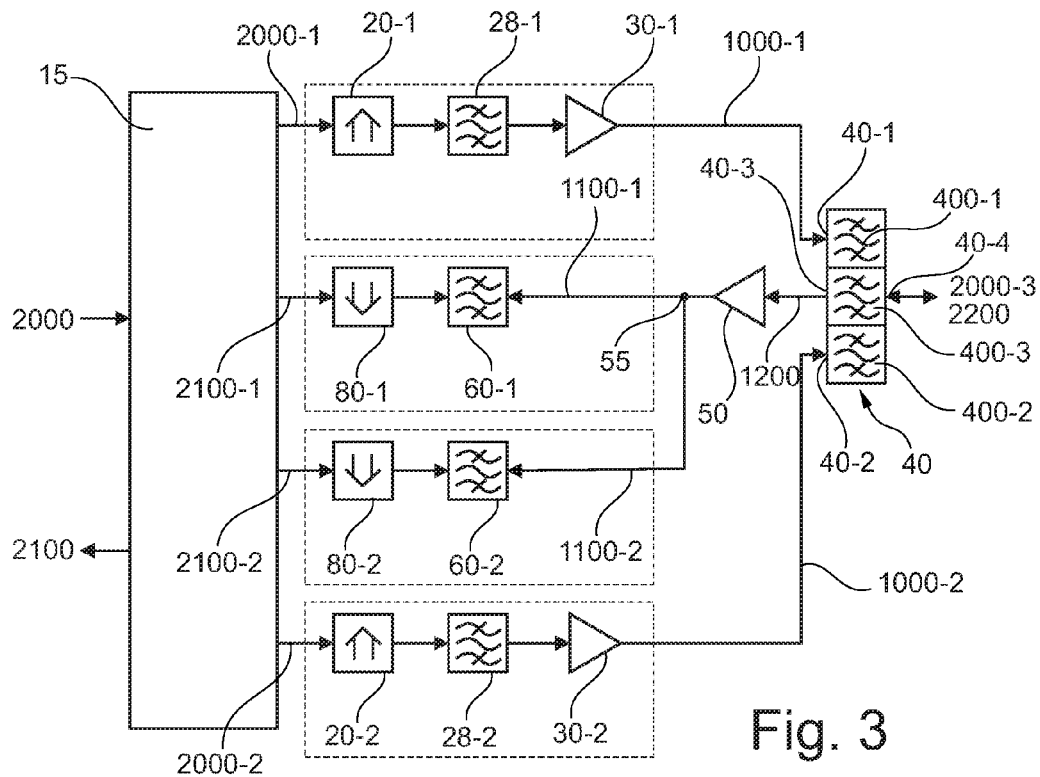
FIG. 3 shows a dual-band transceiver according to the present disclosure.

FIG. 3 shows a first aspect of a dual band transceiver 1 according to the present disclosure. The dual band transceiver 1 can be used in active antenna systems or in remote radio heads.

A digital signal processor (DSP) 15 receives and processes a transmit digital signal 2000, to be transmitted to an antenna element. The digital signal processor (DSP) 15 also receives and processes a receive digital signal 2100, to be sent to a base station or radio interface.

The digital transmit signals 2000 or the digital receive signals 2100 typically comprise an in phase portion (I) and a quadrature phase portion (Q). The digital formats for the digital transmit signals 2000 or the digital receive signals 2100 in an (I, Q) format are known in the art and will not be explained any further.

Figure 1:
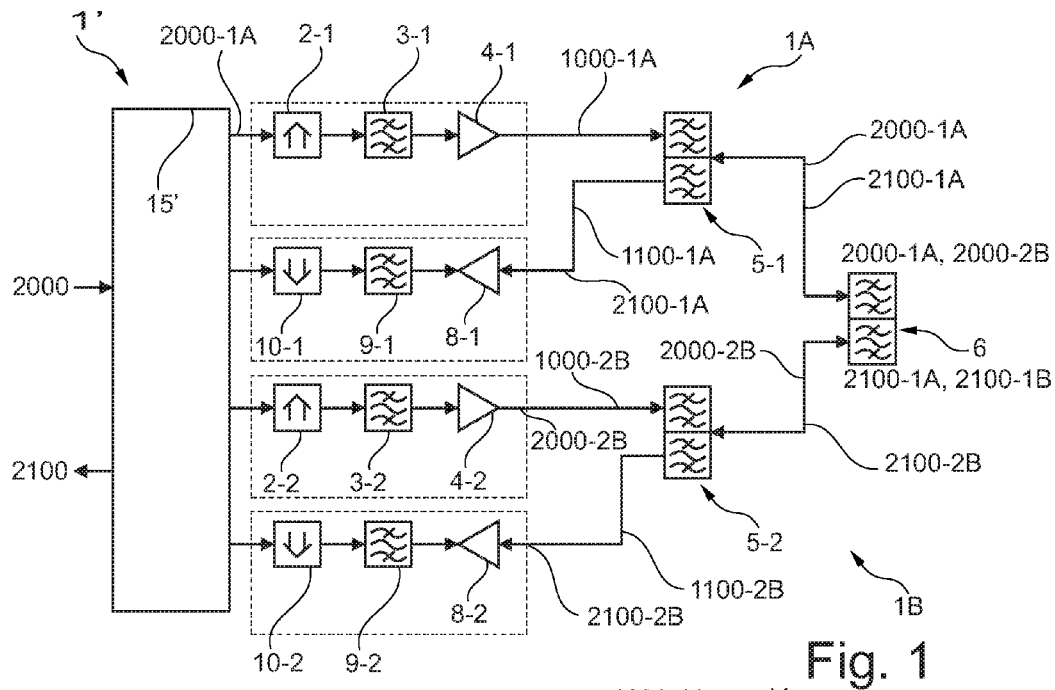
FIG. 1 shows a first conventional dual-band transceiver as known in the prior art.
Figure 2:
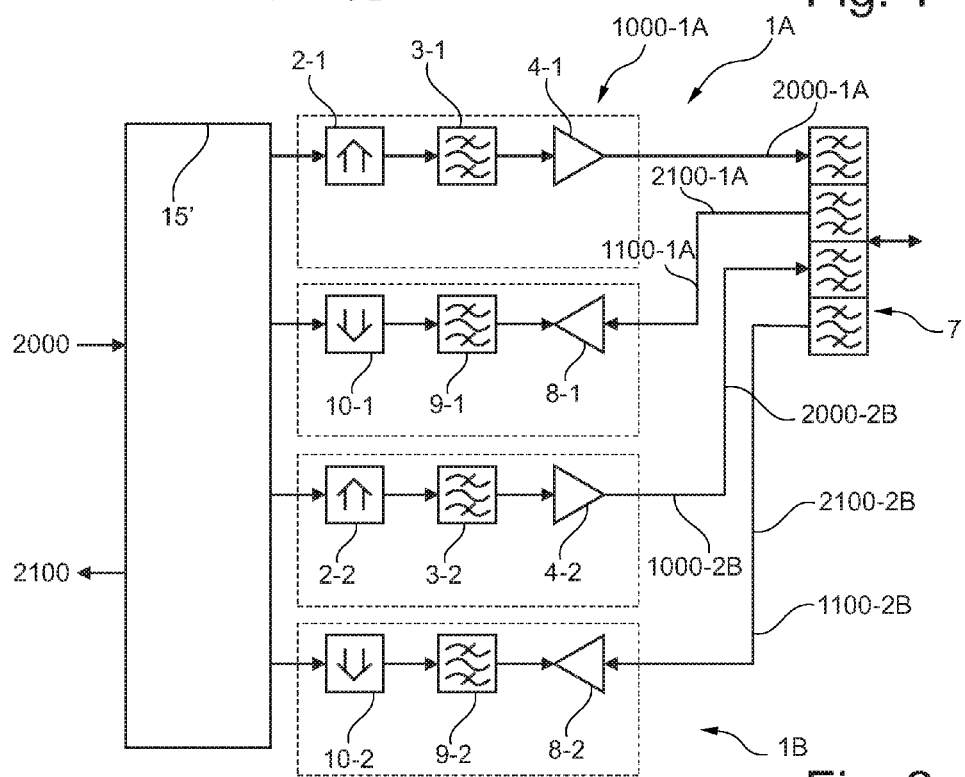
FIG. 2 shows an alternative conventional dual-band transceiver as known in the prior art

The dual band transceiver 1 as shown in FIG. 3 comprises at least two transmit paths 1000-1, 1000-2 and at least two receive paths 1100-1, 1100-2. There are two different transmit paths and two receive paths displayed within FIG. 1. It will however be appreciated by the person skilled in the art that the number of transmit paths 1000-1, 1000-2 and the number of receive paths 1100-1, 1100-2 can be changed and is not limiting of the invention. In a typical non-limiting implementation there will be thirty two transmit paths (for a dual-band, 16-element active antenna system), but this is not limiting of the invention. FIG. 3 shows only a dual-band implementation for a single antenna element. Each one of the transmit paths 1000-1, 1000-2 is terminated by an output to an antenna element (not shown on FIG. 3).

The transmit signal 2000 is processed by the digital signal processor 15, for example undergoing filtering, upconversion, crest factor reduction and beamforming processing, prior to forwarding along the transmit path 1000-1, 1000-2 to a digital-to-analogue conversion and upconversion block 20-1, 20-2 adapted to convert the transmit signal 2000 into an analogue transmit signal 2000-1, 2000-2 in the RF spectrum. The analogue transmit signal 2000-1, 2000-2 may also be provided as pairs of amplitude and phase values (A, P). The analogue transmit signal 2000 is not changed by the selected form of the transmit signal 2000 i.e. (I,Q) or pairs of amplitude and phase (A, P).

The transmit signal 2000-1 comprises signals of frequencies in a first transmit band frequency TB1. The transmit signal 2000-2 comprises signals of frequencies in a second transmit frequency band TB2. The first frequency transmit band TB1 and the second frequency transmit band TB2 are as defined by the communication standard, such as for example 3GPP, as will be described later with reference to FIGS. 6 and 7.

The digital-to-analogue conversion and upconversion blocks 20-1, 20-2 may comprise conventional digital-to-analogue converters for converting the digital transmit signal 2000 into an analogue transmit signal 2000-1, 2000-2. The analogue transmit signal 2000-1, 2000-2 may be upconverted in an up-conversion block comprising an up-mixer along with a filter, as is known in the art. The up mixers are known in the art and will not be discussed further within this disclosure. The up-conversion block may comprise a local oscillator input port and this input port receives a local oscillator signal from a local oscillator.

Alternately, the digital-to-analogue conversion and upconversion blocks 20-1, 20-2 may be in the form of delta-sigma digital-to-analogue converters.

The output of the digital-to-analogue conversion and upconversion block 20-1, 20-2 is passed to a first filter 28-1, 28-2. The first filter 28-1, 28-2 may be any filter adapted to appropriately filter the analogue transmit signal 2000-1, 2000-2 leaving the digital-to-analogue conversion and up-conversion block 20-1, 20-2. Typically, the first filter 28-1, 28-2 comprises a band pass filter. The first filter 28-1, 28-2 allows the analogue transmit signal 2000-1, 2000-2 to pass the first filter 28-1, 28-2, in the first transmit frequency band TB1 or the second transmit frequency band TB2. The purpose of the first filter 28-1, 28-2 is to remove unwanted products from the digital to analogue conversion process, such as noise or spurious signals.

The output of the first filter 28-1, 28-2 is passed to a radio frequency amplifier 30-1, 30-2. The transfer characteristics of the radio frequency amplifiers 30-1 30-2 are typically designed to be as identical as possible for each one of the transmit paths 1000-1, 1000-2. Typically a group of the radio frequency amplifiers 30-1, 30-2 is fabricated in a single batch. The use of the radio frequency amplifiers 30-1, 30-2 belonging to the single batch increases the likelihood of the radio frequency amplifiers 30-1, 30-2 having substantially identical characteristics. This is most notably the case if the radio frequency amplifiers 30-1, 30-2 are fabricated using monolithic semiconductor, hybrid or integrated circuit techniques.

The output of the radio frequency amplifiers 30-1, 30-2 is passed to two inputs 40-1, 40-2 of a triplexer 40. The triplexer 40 is adapted to appropriately filter the analogue transmit signal 2000-1 leaving the radio frequency amplifier 30-1 and the analogue transmit signal 2000-2 leaving the radio frequency amplifier 30-2 after an amplification of the analogue transmit signal 2000-1, 2000-2. Typically, the triplexer 40 comprises a transmit band pass filter 400-1 to remove out of band signals for the transmit signal 2000-1 and a transmit band pass filter 400-2 to remove out of band signals for the transmit signal 2000-2.

The transmit signals 2000-1, 2000-2 are outputted at port 40-4 of the triplexer 40, as a combined output transmit signal 2000-3.

The port 40-4 of the triplexer 40 is also adapted to receive a combined analogue receive signal 2200 in two individual frequency bands, a first receive frequency band RB1 and a second receive frequency band RB2.

The triplexer 40 is adapted for filtering the combined receive signal 2200. Typically, the triplexer 40 comprises a receive band pass filter 400-3 to remove out of band signals for the combined receive signal 2200. The band pass filter 400-3 is adapted to pass the two receive frequency bands R131, RB2 of the combined receive signal 2200. The combined receive signal 2200 is outputted at a port 40-4 of the triplexer 40 on a combined receive path 1200.

The combined receive signal 2200 leaving the triplexer 40 is passed to an amplifier 50. The amplifier 50 is a low noise amplifier (LNA), used to amplify the combined receive signal 2200. The amplifier 50 is a shared, wideband, amplifier adapted to amplify the combined receive signal 2200 covering the two receive frequency bands RBI, RB2.

After amplification, the combined receive signal 2200 is passed to a splitter 55 for splitting the combined receive path 1200 into the individual receive paths 1100-1, 1100-2 carrying the receive signals 2100-1, 2200-2.

The individual receive paths 1100-1, 1100-2 comprise a filter arrangement 60-1, 60-2 followed by an analogue-to-digital conversion and downconversion block 80-1, 80-2.

The filter arrangement 60-1 is adapted for passing the receive band RB1 of the receive signal 2100-1 from the combined receive signal 2200 on the individual receive path 1100-1. The filter arrangement 60-2 is adapted for passing the second receive frequency band RB2 of the received signal 2100-2 from the combined receive signal 2200. After filtering, the receive signal 2100-1 on the receive path 1100-1 comprises frequencies in the first receive frequency band RB1. The receive signal 2100-2 on the receive path 1100-2 comprises frequencies in the second receive frequency band RB2.

The combination of the splitter 55 and the filter arrangement 60-1, 60-2 allows the separation of the combined receive band on the combined receive path 1200 into individual receive signals 2200-1, 2200-2 in the two frequency bands RB1, RB2, on the individual receive paths 1100-1, 1100-2.

The combination of the splitter 55 and the filter arrangement 60-1, 60-2 may be replaced by a conventional diplexer 60, as will be described with reference to FIG. 4.

The individual receive signal 2100-1, 2100-2 on the individual receive paths 1100-1, 1100-2 is passed to the analogue-to-digital conversion and downconversion block 80-1, 80-2 for downconverting and digitizing the receive signal 2100-1, 2100-2. The down-conversion block is adapted to down convert the analogue receive signal 2100-1, 2100-2, as is known in the art.

The analogue-to-digital conversion and downconversion block 80-1, 80-2 may comprise a down-conversion block comprising a down-mixer along with a filter. Alternately, the analogue-to-digital conversion and downconversion block 80-1, 80-2 may be in the form of delta-sigma analogue-to-digital converters.

The digital receive signal 2100-1, 2100-2 is thereafter passed to the DSP 15 for processing. The digital receive signal 2100-1, 2100-2 is processed by the digital signal processor 15, for example undergoing filtering, downconversion and beamforming processing prior to forwarding to a base station or a radio interface.

Figure 4:
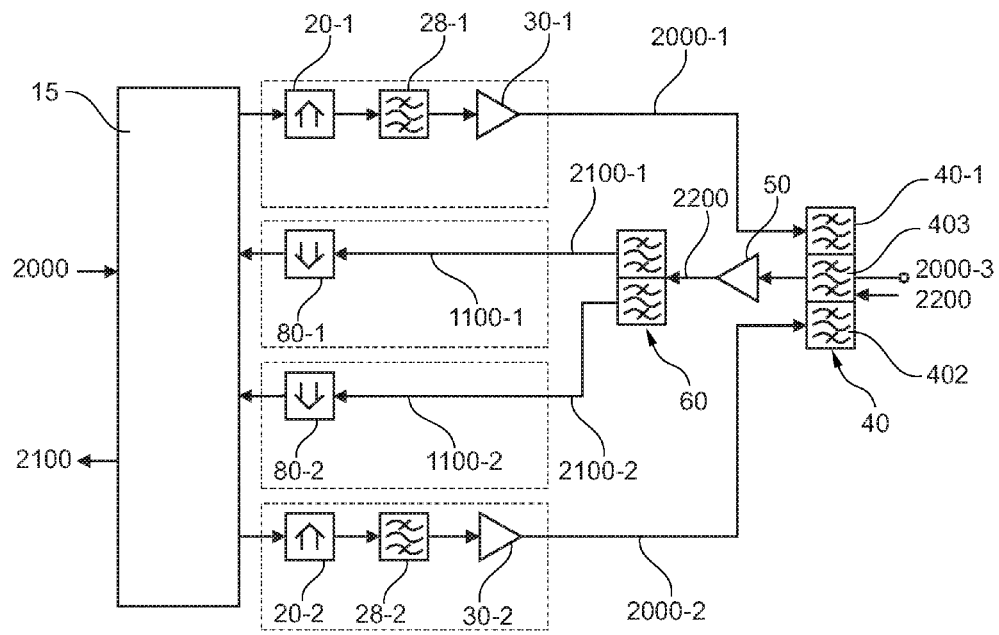
FIG. 4 shows a further aspect of a dual-band transceiver according to the present disclosure.

FIG. 4 shows an alternative aspect of the dual band transceiver 1 of FIG. 3. The alternative aspect of the dual band transceiver 1 of FIG. 4 differs from the dual band transceiver 1 of FIG. 1 in that the splitter 55 and the filter arrangement 60-1, 60-2 is replaced by a diplexer 60. The dual band receiver of FIG. 4 still uses a single wide band amplifier 50.

The diplexer 60 is adapted to separate and filter the combined receive signal 2200 into two individual receive signals 2100-1, 2100-2. The first receive signal 2100-1 leaving the diplexer 60 on the receive path 1100-1 comprises frequencies in the first receive frequency band RB1. The second receive signal 2100-2 leaving the diplexer 60 on the receive path 1100-2 comprises frequencies in the second receive frequency band RB2.

Figure 5:
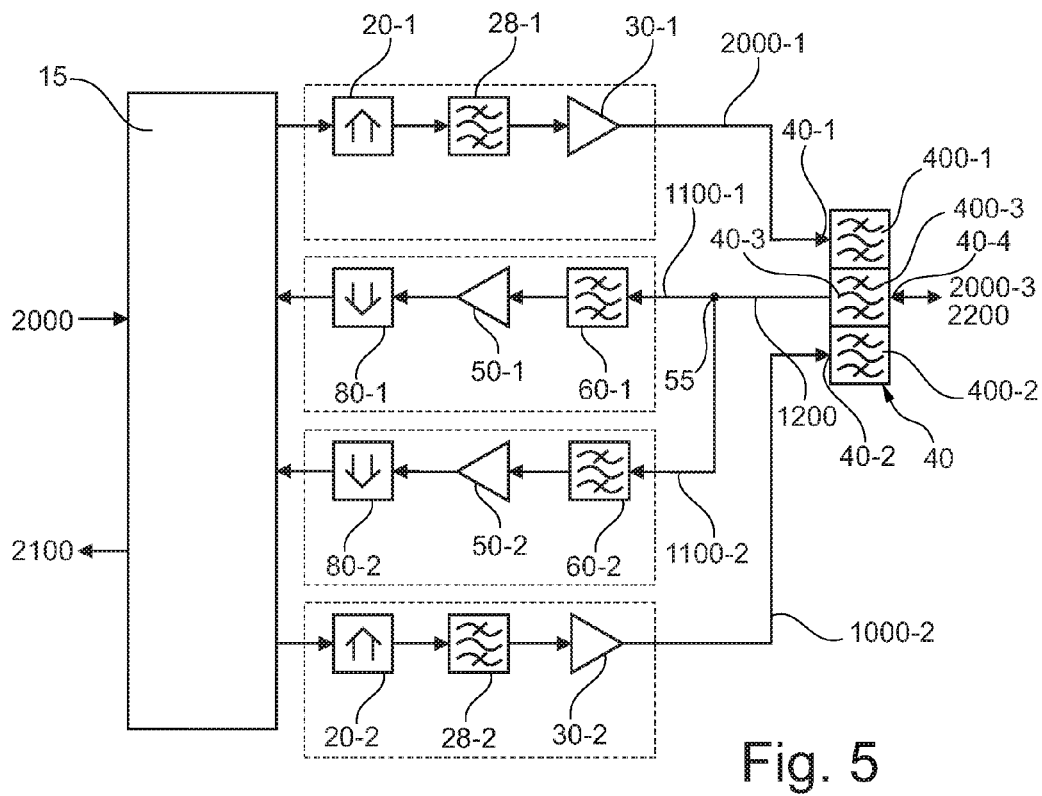
FIG. 5 shows a further aspect of dual-band transceiver according to the present disclosure.

It will be appreciated that the diplexer 60 may comprise a combination of a low-pass filter and a high-pass filter and this is appropriate if the uplink band-pass filter within the triplexer, has an appropriately-steep roll-off such that further filtering at these points is not required. If this is not the case, the filters making up the diplexer typically are band-pass filters. Alternately, the filters of the diplexer could be a combination of a low-pass filter and a band-pass filter if only one side of the roll-off is sufficiently steep and vice-versa with band-pass and high-pass filters, if it is the other side that has an insufficiently steep roll-off FIG. 5 shows an alternative aspect of the dual band transceiver 1 of FIG. 3. The alternative aspect of the dual band transceiver 1 of FIG. 5 differs from the dual band transceiver 1 of FIG. 1 in that the single wide band amplifier 50 is replaced by two amplifiers 50-1, 50-2 on each of the individual receive paths 1100-1, 1100-2.

In the transceiver of FIG. 5, the combined receive signal 2200 leaving the triplexer 40 is passed to the splitter 55 for splitting the combined receive path 1200 into the individual receive paths 1100-1, 1100-2.

Each of the individual receive paths 1100-1, 1100-2 comprises a filter arrangement 60-1, 60-2, an individual amplifier 50-1, 50-2, followed by an analogue-to-digital conversion and downconversion block 80-1, 80-2.

The first filter arrangement 60-1 is adapted for passing the receive frequency band RB1 of the first received signal 2100-1 from the combined receive signal 2200 on the first individual receive path 1100-1. The second filter arrangement 60-2 is adapted for passing the second receive frequency band RB2 of the second received signal 2100-2 from the combined receive signal 2200.

The combination of the splitter 55 and the filter arrangement 60-1, 60-2 allows the separation of the combined receive band on the combined receive path 1200 into individual receive signals 2100-1, 2100-2 in the receive frequency bands RB1, RB2, on the individual receive paths 1100-1, 1100-2.

The filter arrangement 60-1, 60-2 are preferably band-pass filters, which are located upstream of the amplifier 50-1, 50-2 on the receive path 1100-1, 1100-2. The filter arrangement 60-1, 60-2 may therefore be adapted to have a reduced through path loss.

Figure 6:
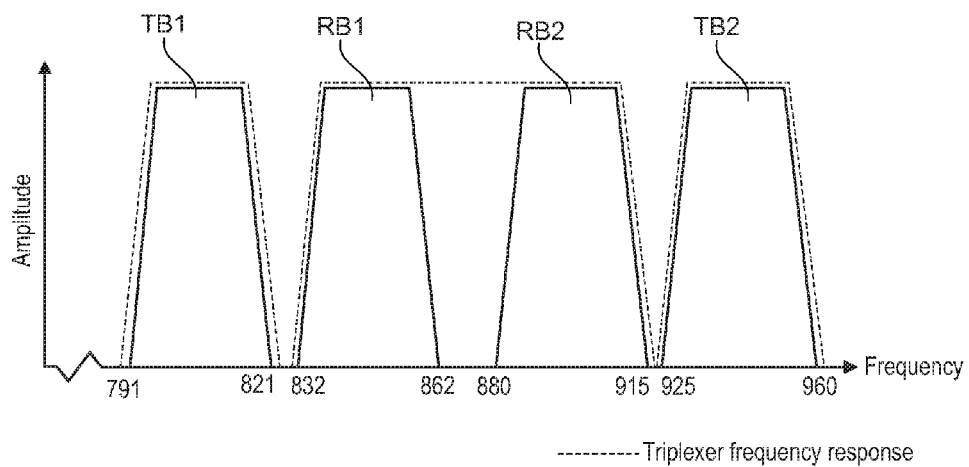
FIG. 6 shows an example of a frequency band plan used in conjunction with a dual-band transceiver according to the present disclosure
Figure 7:
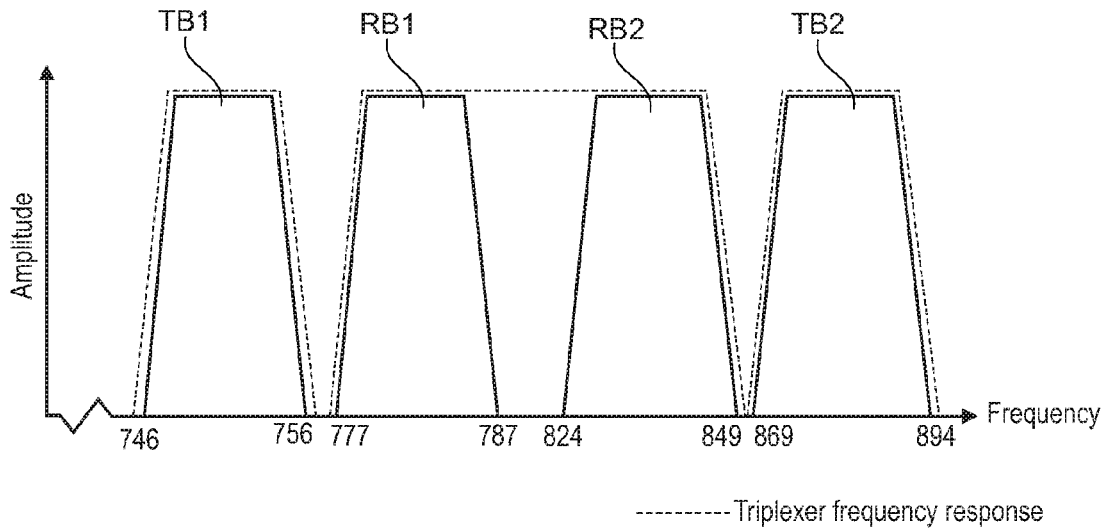
FIG. 7 shows a further example of a frequency band plan used in conjunction with a dual-band transceiver according to the present disclosure.

FIGS. 6 and 7 illustrate frequency band plans for a radio base-station as defined by telecommunication standards.

FIG. 6 shows the 800 & 900 MHz band plans, from the perspective of a base-station transceiver, typically used in European countries. There are two receive bands and two transmit bands, as viewed by a base station.

The first transmit band comprises frequencies preferably between 791 MHz and 821 MHz. The second transmit band comprises frequencies preferably between 925 MHz and 960 MHz.

The first receive band comprises frequencies preferably between 832 MHz and 862 MHz. The second receive band comprises frequencies preferably between 880 MHz and 915 MHz.

Referring to FIGS. 3-5, and applying the European 800 & 900 MHz band plans in the transmit paths 1000-1, 1000-2, the first filter 28-1 and the band pass filter 400-1 of the duplexer 40 are adapted to pass the first frequency transmit band TB1 in the range comprised between 791 MHz and 821 MHz. The second filter 28-2 and the second band pass filter 400-2 of the duplexer 40 are adapted to pass the second transmit frequency band TB2 in the range between 925 MHz and 960 MHz.

Similarly, the receive filter 400-3 of the triplexer 40 is adapted to pass the frequencies of the two receive bands RB1, RB2, i.e. in the range between 832 MHz and 915 MHz. The first filter arrangement 60-1 is preferably a band-pass filter for the first receive frequency band RB1 between 832 MHz and 862 MHz, whilst the second filter arrangement 60-2 is preferably a band-pass filter for the second receive frequency band RB2 between 880 MHz and 915 MHz.

FIG. 7 shows the 700 & 850 MHz band plans, typically used in the United States of America. There are two receive bands and two transmit bands, as viewed by a base station.

The first transmit band TB1 comprises frequencies preferably between 746 MHz and 756 MHz. The second transmit band TB2 comprises frequencies preferably between 869 MHz and 894 MHz.

The first receive band RB1 comprises frequencies preferably between 777 MHz and 787 MHz. The second receive band RB2 comprises frequencies preferably between 824 MHz and 849 MHz.

The man skilled in the art will recognise that the receive bands of FIG. 6 and FIG. 7 are adjacent to each other. The present transceiver contemplates covering the two receive bands RB1, RB2 by a single filter element 403, in the triplexer 40.

The present disclosure describes a transceiver architecture which allows a relatively simple triplexer solution to be used in place of a multiple-duplexer/diplexer solution for combining signals from two different bands into a single antenna element. The present system recognises that in both likely combinations of bands (for example, 800/900 MHz for Europe and 700/850 MHz for the US), the uplink or receive frequencies are adjacent and hence can be served by a single filter portion in a triplexer. Simplifying this element reduces the size of this component and, more significantly, its likely loss and cost. The low noise amplifier may be also shared between the combination of receive bands, for amplifying the combined receive bands on the combined one of the at least two receive paths. This further reduces the size and cost of the radio transceiver.

Figure 8:
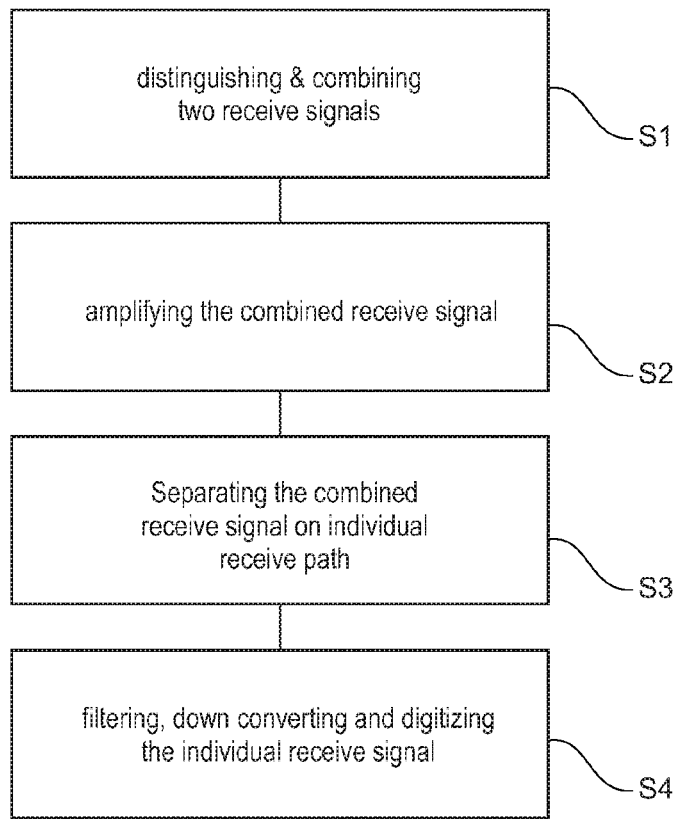
FIG. 8 shows a method for the reception of combined receive signals in at least two frequency bands according to the present disclosure.

FIG. 8 shows a method for the reception of combined receive signals in at least two frequency bands RB1, RB2.

In a first step S1, two receive signals 2100-1, 2100-2 are distinguished from at least two transmit signals 1100-1, 110-2. The two receive signals 2100-1, 2100-2 are combined to form to form filtered combined receive signal 2200.

The filtered combined receive signal 2200 is amplified using the single amplifier 50 to form amplified combined receive signal, at step S2.

The amplified combined receive signal 2200 is separated into individual receive signals 2100-1, 2100-2 in the receive frequency bands RB1, RB2 on individual receive paths 1100-1, 1100-2, at step S3.

The individual receive signal 1100-1, 1100-2 carrying the receive frequency bands RB1, RB2 are filtered, down converted and converted into a digital signal at step S4.

The disclosure further relates to a computer program product embedded on a non-transitory computer readable medium. The computer program product comprises executable instructions for the manufacture of the multiband transceiver 1 according to the present invention.

The disclosure relates to yet another computer program product. The yet another computer program product comprises instructions to enable a processor to carry out the method for the reception of combined receive signals in at least two frequency bands RB1, RB2 according to the invention.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transistory computer useable (e.g. readable) medium configured to store the software. Such software can enable, for example, the function, fabrication, modelling, simulation, description and/ or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer useable medium such as semiconductor, magnetic disc, or optical disc (e.g., CD-ROM, DVD-ROM, etc.). The software can also be disposed as a computer data signal embodied in a non-transitory computer useable (e.g. readable) transmission medium (e.g., carrier wave or any other medium including digital, optical, analogue-based medium). Embodiments of the present invention may include methods of providing the apparatus described herein by providing software describing the apparatus and subsequently transmitting the software as a computer data signal over a communication network including the internet and intranets.

It is understood that the apparatus and method describe herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A radio transceiver comprising at least two individual receive paths and at least two individual transmit paths;
   a triplex band pass filter arrangement for separating individual transmit signals of the at least two individual transmit paths from combined receive signals within different receive frequency bands of the at least two individual receive paths by filtering, to form filtered combined receive signals within different receive frequency bands,
   a splitter for splitting the filtered combined receive signals within different receive frequency bands of the at least two receive paths into the individual receive paths, a second filter arrangement for separating combined receive frequency bands on the filtered combined receive signals within different receive frequency bands of the at least two receive paths into individual receive signals within individual receive frequency bands on the individual receive paths.

2. The radio transceiver according to claim 1, wherein the triplex band pass filter arrangement comprises a band pass filter adapted to filter at least two combined receive frequency bands.

3. The radio transceiver according to claim 1, comprising an amplifier for amplifying the filtered combined receive signals within different receive frequency bands of the at least two receive paths.

4. The radio transceiver according to claim 1, wherein the second filter arrangement comprises at least two individual filters, one of the at least two individual filters being on one of the at least two individual receive paths and being adapted to filter one receive frequency band from the combined receive frequency bands, and another one the at least two individual filters being on another one of the at least two individual receive paths and being adapted to filter another receive frequency band from the combined receive frequency bands.

5. The radio transceiver according to claim 1, wherein the splitter and the second filter arrangement comprises a diplex filter.

6. The radio transceiver according to claim 1, comprising at least two individual amplifiers, one of the at least two individual amplifiers being on one of the at least two individual receive paths for amplifying an individual one of the at least two receive frequency bands, and another one the at least two individual amplifiers being on another one of the at least two individual receive paths for amplifying another individual one of the at least two receive frequency bands.

7. A method for the reception of combined receive signals in at least two receive frequency bands comprising the steps of:
   distinguishing the combined receive signals within different receive frequency bands from at least two transmit signals by filtering, to form filtered combined receive signals within different receive frequency bands;
   amplifying the filtered combined receive signals within different receive frequency bands using a single amplifier to form amplified combined receive signals within different receive frequency bands;
   separating the amplified combined receive signals within different receive frequency bands into at least two individual receive signals within individual receive frequency bands, one of the at least two individual receive signals being in one of the at least two individual receive frequency bands, and another one of the at least two individual receive signals being in another one of the at least two individual receive frequency bands.

8. The method for the reception of combined receive signals according to claim 7, comprising filtering at least two combined receive frequency bands with a bandpass filter adapted for filtering the at least two combined receive signals within different receive frequency bands.

9. The method for the reception of combined receive signals according to claim 7, comprising amplifying the combined receive bands on the combined receive signals within different receive frequency bands of the at least two receive paths.

10. The method for the reception of combined receive signals according to claim 7, wherein the step of separating the amplified combined receive signals within different receive frequency bands into individual receive signals within individual receive signal bands comprises separating the amplified combined receive signals within different receive frequency bands into individual receive signal within individual receive frequency bands on individual receive paths.

11. A computer program product comprising a non-transitory computer-usable medium having control logic stored therein for causing a computer to manufacture a radio transceiver for a mobile communications network, the radio transceiver comprising:
   at least two individual receive paths and at least two individual transmit paths;
   a triplex band pass filter arrangement for separating individual transmit signals of the at least two individual transmit paths from combined receive signals within different receive frequency bands of the at least two individual receive paths by filtering, to form filtered combined receive signals;
   an amplifier for amplifying the combined receive bands on the filtered combined receive signals within different receive frequency bands of the at least two receive paths,
   a splitter for splitting the filtered combined receive signals within different receive frequency bands of the at least two receive paths into the individual receive paths;
   a second filter arrangement for separating combined receive frequency bands on the filtered combined receive signals within different receive frequency bands of the at least two receive paths into individual receive signals within individual receive frequency bands on the individual receive paths.

12. A computer program product comprising a non-transitory computer-usable medium having control logic stored therein for causing a transceiver to execute a method for the reception of combined receive signals in at least two receive frequency bands comprising:
   first computer readable code means for distinguishing the combined receive signals within individual receive frequency bands from at least two transmit signals by filtering, to form filtered combined receive signals within individual receive frequency bands;
   second computer readable code means for amplifying the filtered combined receive signals within individual receive frequency bands using a single amplifier to form amplified combined receive signals within different receive frequency bands;
   third computer readable code means for separating the amplified combined receive signals within different receive frequency bands into individual receive signals within individual receive signal bands in the at least two individual receive frequency bands.

* * * * *

UNITED STATES PATENT AND TRADEMARK OFFICE
CERTIFICATE OF CORRECTION

PATENT NO. : 8,290,536 B2
APPLICATION NO. : 12/898208
DATED : October 16, 2012
INVENTOR(S) : Kenington et al.

Page 1 of 1

It is certified that error appears in the above-identified patent and that said Letters Patent is hereby corrected as shown below:

In the Specifications:

- Column 4, line 19, the word "to" should be deleted

- Column 7, line 13, "R131" should be "RB1"

- Column 7, line 21, "RBI" should be "RB1"

In the Claims:

- Column 12, Claim 12, line 7, "individual" should be "different"

- Column 12, Claim 12, line 10, "individual" should be "different"

- Column 12, Claim 12, line 12, "individual" should be "different"

Signed and Sealed this
Fifteenth Day of January, 2013

David J. Kappos
*Director of the United States Patent and Trademark Office*